United States Patent [19]

Nichols et al.

[11] 4,194,604
[45] Mar. 25, 1980

[54] HYDRODYNAMIC TORQUE CONVERTOR WITH DOUBLE CIRCUIT TORUS FLOW AND LOCK-UP CLUTCH

[75] Inventors: Robert W. Nichols, Canton; Stanley L. Pierce, Jr., Walled Lake, both of Mich.

[73] Assignee: Ford Motor Company, Dearborn, Mich.

[21] Appl. No.: 850,997

[22] Filed: Nov. 14, 1977

[51] Int. Cl.² ............................................ F16H 45/02
[52] U.S. Cl. .................................... 192/3.3; 192/3.26
[58] Field of Search ..................... 192/3.3, 3.29, 3.31, 192/3.26, 3.33

[56] References Cited

U.S. PATENT DOCUMENTS

| | | | |
|---|---|---|---|
| 3,252,352 | 5/1966 | General et al. | 192/3.29 |
| 3,777,863 | 12/1973 | Chana | 192/3.33 |
| 4,049,093 | 9/1977 | Vukovich et al. | 192/3.3 |

Primary Examiner—Benjamin Wyche
Attorney, Agent, or Firm—Donald J. Harrington; Keith L. Zerschling

[57] ABSTRACT

A hydrodynamic torque converter mechanism having a bladed impeller, a bladed turbine and a bladed stator arranged in a toroidal fluid flow circuit enclosed within a common impeller housing, a friction clutch in the housing including a clutch disc with a friction surface thereon situated adjacent a cooperating friction surface formed on the housing, a stator sleeve shaft supporting the stator, an impeller sleeve hub journalled on the housing, a turbine shaft connected to the turbine and extending through the stator sleeve shaft, and a double circuit flow path for fluid circulating through the torus circuit, one circuit being defined in part by the annular space between the impeller hub and the stator sleeve shaft and the other circuit being defined by the annular space between said turbine shaft and said stator sleeve shaft and by the annular flow space between said friction surfaces.

2 Claims, 2 Drawing Figures

HYDRODYNAMIC TORQUE CONVERTOR WITH DOUBLE CIRCUIT TORUS FLOW AND LOCK-UP CLUTCH

GENERAL DESCRIPTION OF THE INVENTION

My invention relates generally to hydrokinetic torque converter mechanisms of the type disclosed in U.S. Pat. Nos. 3,239,037; 3,541,893 and 3,252,352 and in application Ser. No. 849,723, filed Nov. 9, 1977, entitled "HYDROKINETIC TORQUE CONVERTER WITH LOCK-UP CLUTCH". Each of these disclosures is assigned to the assignee of this invention. Each shows a converter with a lock-up clutch for connecting the turbine to the impeller, but the torus fluid feed passage for the converter includes a passage located within the turbine shaft. That requires drilling of the turbine shaft which produces stress concentrations that weaken the shaft. Thus it is necessary to provide a shaft of increased size in order to accommodate a converter of any given torque capacity.

The converters shown in U.S. Pat. Nos. 3,638,771 and 3,463,033 include lock-up clutches but the turbine shaft is not drilled to provide a torus flow passage. Both of these patent disclosures, however, as well as the disclosures of the patents identified above, lack a showing of a double flow path in the torus circuit. The improvement of my invention makes it possible to provide an increased flow through the circuit to provide adequate cooling when the converter is operating in the torque multiplication mode and in the converter coupling mode.

One part of the two-circuit flow path for the torus flow passes through the annular space between the friction surfaces of the clutch structure and then is returned through openings formed in the clutch hub and through the annular space between the turbine shaft and the stator sleeve shaft. This indirect flow path in some instances may make it difficult to provide adequate flow through the converter for cooling purposes. The improvement of my invention supplements this flow by providing a parallel flow path that does not necessitate passage of fluid through the clutch structure. Instead the supplemental flow passes directly from the exit section of the turbine and through a one-way valve into the normal discharge flow path. Both flow paths through the circuit originate at the flow entrance section of the impeller.

When the converter is operated at high speed ratios, the torus flow velocity is reduced because of the presence of a centrifugal static pressure buildup at the flow entrance section of the turbine. This tends to oppose the centrifugal head of the impeller, but adequate cooling is maintained notwithstanding the resulting decreased flow.

During some operating conditions it is possible that at the increased flow which occurs when the converter operates in the lowest speed ratio range, the clutch disc may tend to engage to provide an unscheduled lock-up of the impeller and the turbine. This condition is noticeable in arrangements of the type shown in U.S. Pat. No. 3,252,352, for example. In the converter of my invention, however, the clutch drift-on problem is not present even though the converter may be operating at or near the lowest speed ratio because there always will be a pressure drop across the radial annular flow passage defined by the friction clutch surfaces.

PARTICULAR DESCRIPTION OF THE INVENTION

Figure 1:
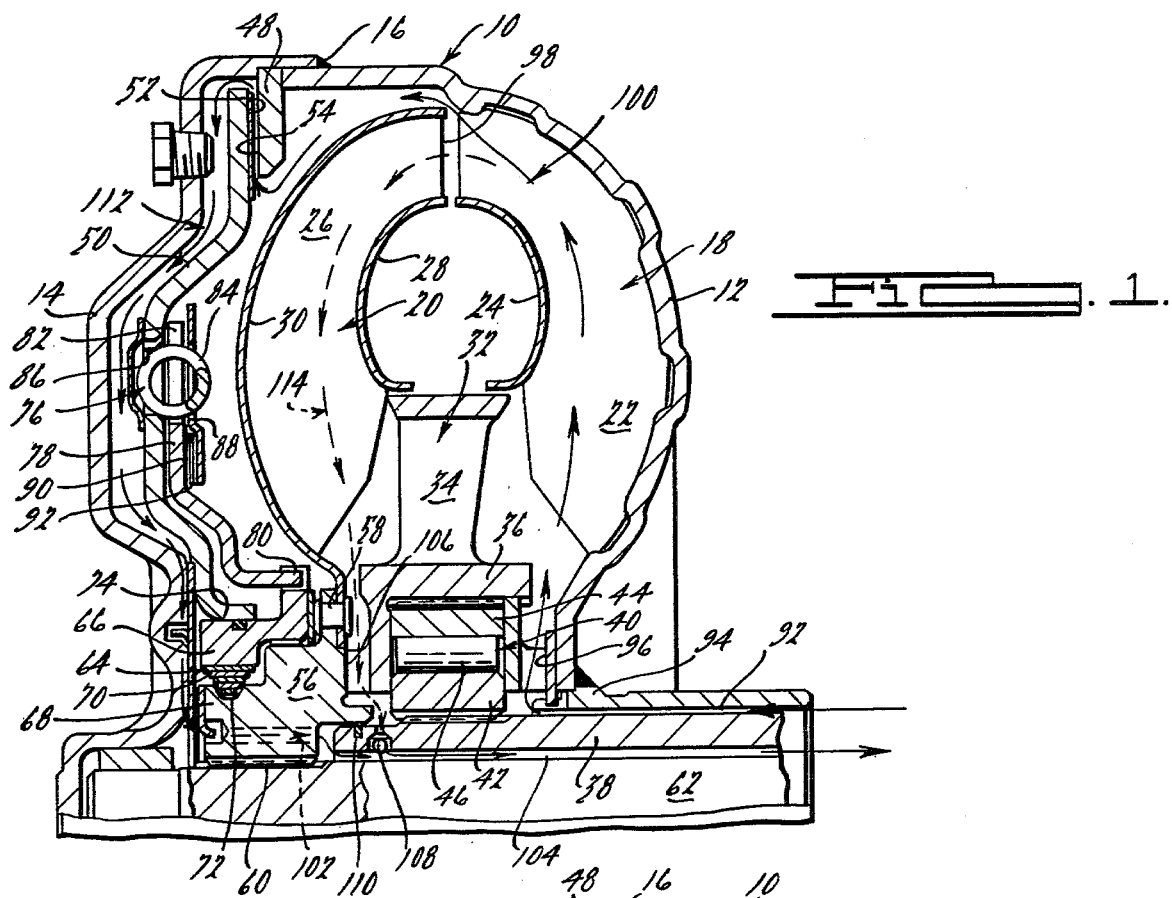
FIG. 1 shows in cross-sectional form a hydrokinetic torque converter with an integral lock-up clutch for connecting the converter turbine with the converter impeller and having a double circuit toroidal fluid flow path, the clutch being shown in an unlocked mode.
Figure 2:
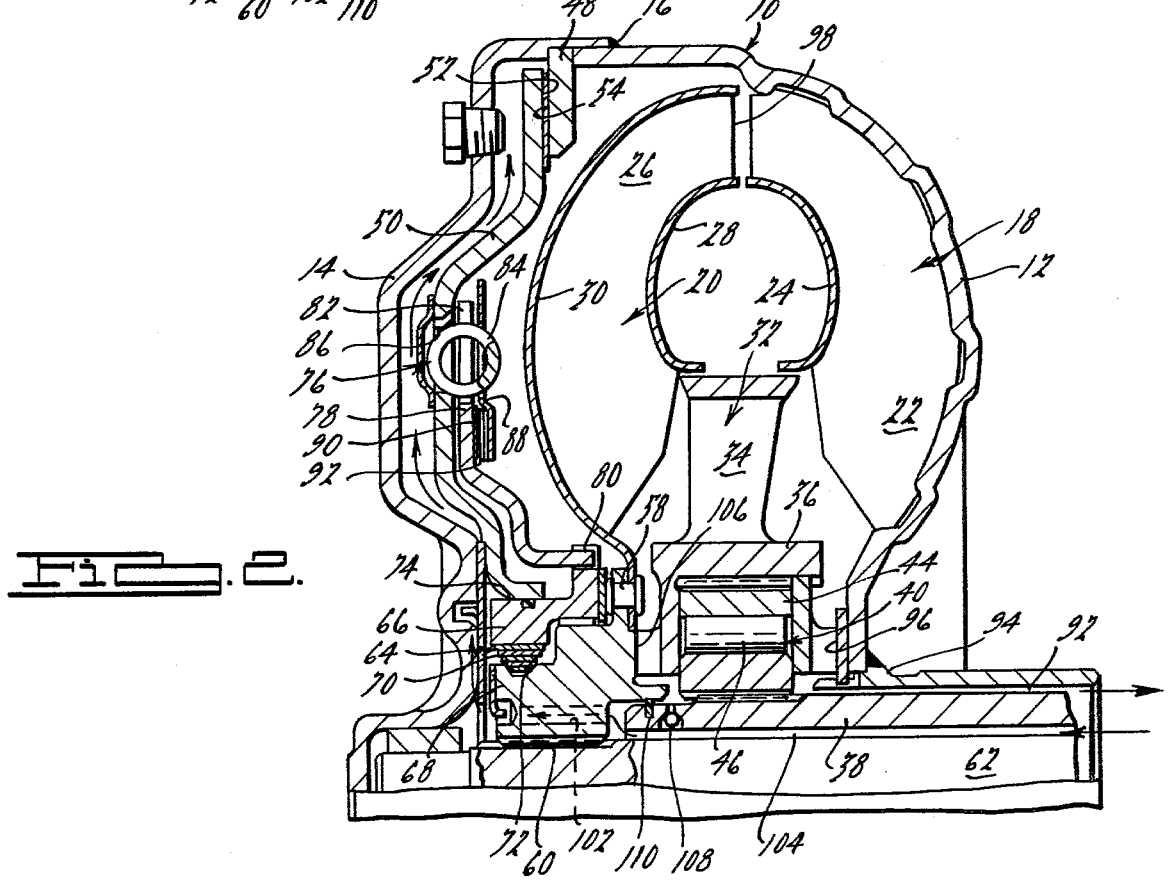
FIG. 2 is a view similar to the view of FIG. 1 with the lock-up clutch shown in the locked mode.

In FIG. 1 reference character 10 designates a converter housing. it includes an impeller housing 12 and an end plate 14. End plate 14 is jointed to the converter housing 12 at the periphery of the housing 10, as shown at 16, to provide an enclosure that contains the impeller and the turbine.

The impeller is identified by reference character 18 and the turbine is identified by reference character 20. The impeller includes radial outflow blades 22 that are joined at their outer margins to the interior wall of the impeller housing 12. Blades 22, together with the inner shroud 24, define radial outflow passages. Turbine blades 26 are situated between the turbine inner shroud 28 and an outer shroud 30. The turbine blades 26 define radial inflow passages which, together with the flow passages of the impeller, define an annular torus circuit. A bladed stator 32 is located between the flow exit section of the turbine and the flow entrance section of the impeller. Stator 32 includes radial blades 34 carried by stator hub 36.

A stator sleeve shaft 38 is connected to the transmission housing not shown. An overrunning brake 40 located within the stator hub includes an inner brake race 42 which is splined to the stator sleeve shaft 38. Outer race 44 carried by the hub 36 is formed with cam surfaces which are engaged by overrunning brake rollers 46 to inhibit rotation of the stator in a direction opposite the direction of rotation of the impeller while permitting freewheeling motion of the stator in the opposite direction during coupling operation of the converter.

An annular clutch plate 48 is carried by the periphery of the housing 10 within the interior of the housing. Clutch plate 50 is situated between the shroud 30 and the end plate 14. It includes a friction surface 52 located directly adjacent friction surface 54 formed on the plate 50.

The turbine includes a hub 56 which is joined by rivets or other suitable fastening means 58 to the hub of shroud 30. It is splined at 60 to turbine shaft 62 situated within the turbine sleeve shaft 38.

An overrunning clutch 64 is situated between the clutch plate 50 and the hub 56. It includes an outer race 66, an inner race 68 and a multiple wrap clutch spring 70, the outer winding of which is carried by the outer race 66. The inner race is provided with a V-shaped groove 72 which receives the windings of the clutch element 70. The sides of the groove 72 are engageable with the edges of the windings of the clutch element 70. Frictional contact is established between the edges of the windings 70 and the inner race 68, thus establishing a one-way clutching action between the race which permits movement of the hub 56 in one direction relative to the race 66, but relative motion in the opposite direction is prevented.

The race 66 includes a cylindrical sealing surface 74 which is surrounded by a central opening formed in the clutch disc 50. Slight shifting movement of the clutch disc 50 relative to the turbine can be accommodated by the sliding action between the disc and the race that is permitted.

A cushion spring and damper assembly 76 is carried by the disc 50. A clutch drive plate 78 is keyed at 80 to the outer race 66. A radially outward margin 82 of the drive disc 78 includes projections that extend between alternate pairs of cushion springs 84, which in turn are received within openings 86 in the clutch plate 50. A damper plate 88 is connected to and joined integrally with clutch plate 50. It is provided with openings that register with the springs 86. A friction disc 90 is carried by the damper plate 88 and a compression spring 92 of annular shape is located between the plate 88 and the friction disc 90, thus establishing a continuous frictional engagement of the disc 90 with the plate 78. Upon movement of the disc 90 relative to the drive plate 78, frictional dampening occurs. Movement is resisted by the compression springs 84.

Annular space 92 between the stator sleeve shaft 38 and the surrounding hub 94 of the impeller provides an annular flow pasage for the transmission fluid to the interior of the torus circuit. Fluid passes from the annular passage 92 and through radial passages 96 to the entrance section of the impeller. Fluid then passes through the gap 98 between the exit section of the impeller and the entrance section of the turbine, as shown by the flow vector 100. The fluid then passes radially outwardly across the friction surfaces 52 and 54 to the space between the clutch plate 50 and the adjacent wall 14. It then passes radially inwardly and through axial flow passages 102 formed in the turbine hub 56. Fluid then is returned to the discharge side of the flow circuit through the annular passage between the turbine shaft 62 and the stator sleeve shaft 38, the annular flow passage being shown at 104.

The passage of fluid through the circuit is this fashion maintains a pressure differential across the friction surfaces and this pressure differential is sufficient to maintain the clutch plate 50 out of engagement with respect to the clutch plate 48. A secondary fluid flow passage is created by radial inflow passages 106 in the stator hub. Passage 106 communicates with passage 104 through a one-way chick valve 108.

The principal flow, when the converter is in an unlocked condition, occurs through the path identified by vector 112. The balance of the flow occurs through the path identified by vector 114. Adequate oil flow thus is achieved to provide adequate cooling. The pressure differential across the plates holds the plates in an unlocked position. The oil flow across friction surfaces 52 and 54; the remainder of the oil flows through the check valve and through the annular space 104.

When pressure is distributed to the annular passage 104 and annular passage 92 is exhausted, pressure is distributed to the space between the wall 14 and the clutch disc 50 and the static circuit pressure in the torus circuit is descreased. This causes the clutch to become engaged and the impeller and turbine thus rotate in unison. A fluid pressure seal 110 isolates the pressure in passage 106 from the pressure in passage 102. At that time impeller torque is distributed through the damper plate 78, through the overrunning clutch 64 to the turbine hub 56 and then to the turbine shaft 62. If the vehicle coasts while the clutch is applied, the turbine is allowed to overrun the impeller in the usual way thereby providing a hydrodynamic braking since the overrunning clutch 64 will prevent torque delivery from the turbine shaft to the clutch disc 50.

Having thus described a preferred form of my invention, what I claim and desire to secure by U.S. Letters Patent is:

1. A hydrokinetic torque converter mechanism comprising a bladed impeller, a bladed turbine and a bladed stator situated in toroidal fluid flow relationship in a torus circuit, said impeller having an impeller housing enclosing said impeller, said turbine and said stator, a stator sleeve shaft held in a relatively fixed position, an impeller hub sleeve surrounding said stator sleeve shaft and defining therebetween an annular flow passage, a turbine hub joined to said turbine, a turbine shaft secured to said turbine hub and extending through said stator sleeve shaft and defining therewith a second annular flow passage, a lock-up clutch disc located between said turbine and one side of said housing, said housing and said clutch disc each carrying thereon a friction surface, said friction surfaces being arranged in adjacent juxtaposed relationship, a torus circuit fluid flow passage defined in part by said first annular passage and by said second annular passage, said flow circuit including two portions, one portion being defined by the annular space between said friction surfaces and by the space between said clutch disc and said housing and the other portion being defined by a fluid flow bypass passage between the flow exit section of said turbine and said second annular passage, said bypass passage being defined in part by a one-way flow valve, which permits fluid flow from said torus circuit to said second annular passage but prevents fluid flow in the opposite direction, a first of said friction surfaces being located on the periphery of said housing and a second of said friction surfaces being carried by said clutch disc at a location between the first friction surface and a wall of said housing, an increase in the pressure in the space between said one housing side and said clutch disc creating a pressure force on said clutch disc which engages the same to produce a direct driving connection between said turbine and said impeller, said clutch hub being provided with axial flow passages that establish communication between said second annular passage and the space between said clutch disc and said one housing side.

2. The combination as set forth in claim 1 including a one-way clutch connection between said clutch disc and said turbine hub permitting one-way torque delivery from said impeller to said turbine hub but preventing torque delivery from said turbine hub to said impeller thereby permitting said turbine to overrun said impeller.

* * * * *